United States Patent Office 3,325,304
Patented June 13, 1967

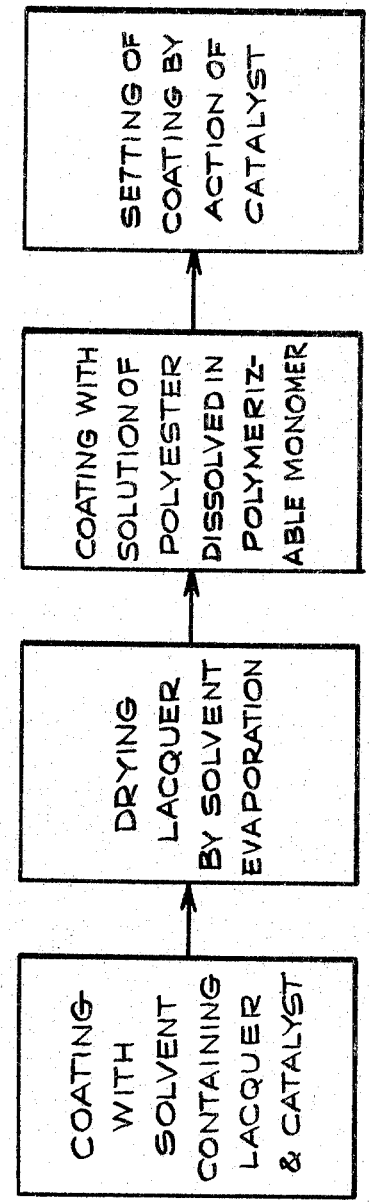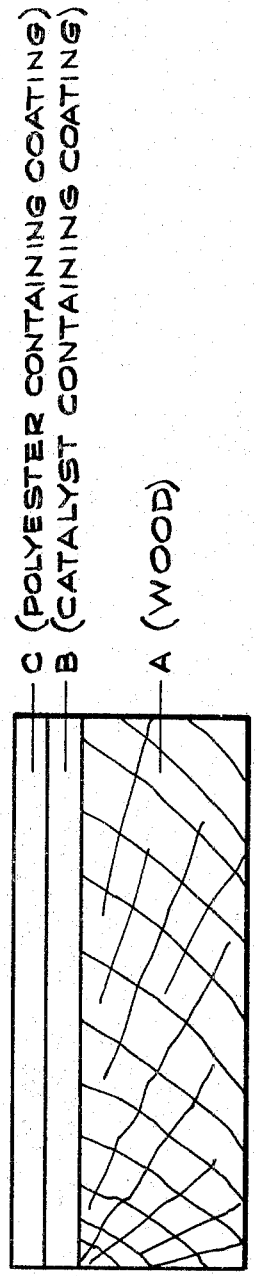

3,325,304
PROCESS FOR HARDENING POLYESTER LAYERS
Karl-Heinz Hauck, Cologne-Sulz, Germany, assignor to Spies, Hecker & Co., a corporation of Germany
Filed Aug. 27, 1965, Ser. No. 483,157
Claims priority, application Germany, Dec. 23, 1954, H 22,509
12 Claims. (Cl. 117—73)

This application is a continuation-in-part of copending application Ser. No. 554,133, filed Dec. 20, 1955, now abandoned.

The present invention relates to a process for hardening polyester layers, and more particularly to an improvement in the process of coating a surface with a coating material containing an unsaturated polyester and a polymerizable monomer which is hardened by a peroxide catalyst, such that the catalyst is first applied to the surface in a hardenable lacquer and the unsaturated polyester coating material thereafter applied, without the occurrence of ripples, mars, unsightly disturbances in the surface disposition of the lacquer, whereby to provide upon polymerization of the polyester coating material a smooth and even over-all covering on the surface, attractive in appearance and durable in use.

Unsaturated polyesters of the maleic acid-glycol ester type which are mixed-polymerized with monomeric styrene are increasing in importance in technology. They are chiefly processed in combination with glass fabrics or glass fleeces as fillers. The advantage of the polyesters in making shaped parts consists in the fact that they can be processed practically without pressure and with simply made tools. Polyesters are also of interest as raw material for lacquer or varnish since it is possible with their aid to produce much thicker layers in one operation than with the usual raw materials for lacquer dissolved in solvents.

Hitherto, solutions of polyesters in monomeric styrene have been intimately mixed with catalysts and, if necessary or desired, accelerators in certain proportions shortly before being processed. Thereafter, these mixtures have only a limited life (shelf life or pot life). For the processing of polyester resins, it had been considered to be indispensable to carefully intermix the catalyst required for the polymerization. Thus, for example, the 1953 issue of the "BASF Handbuch Kunststoffe" states on page 4 with respect to a special casting resin consisting of mixtures of unsaturated polyester resins with polymerizable monomeric compounds that catalyst paste and accelerator solution must be incorporated homogeneously into the liquid casting resin. If rapid hardening of the polyesters is essential, then the shelf life also will be very short due to the addition of increased amounts of catalyst. If the shelf life is to be kept within limits which are reasonable from the commercial point of view, then the hardening times are generally inconveniently long. While the intermixing of the catalysts with polyester mixtures without fillers is still relatively easy, considerable difficulties are encountered to obtain homogeneous distribution of the catalysts in polyesters dyed with pigments because polyester solutions exhibit a relatively high viscosity after the addition of pigments.

In accordance with a recent development in the art, it has been determined that the peroxide catalyst may be applied to the surface to be coated separately from the polyester coating, whereupon the pot life or shelf life of the polyester coating material may be extended since the same will only polymerize in the presence of the catalyst and since the polyester material only comes into contact with such catalyst when applied to the surface in question after such surface has been provided with the catalyst material thereon, for example in the form of a layer of binder material containing the catalyst, with the provision that such binder material is soluble in the polyester coating material. This permits a free radical transfer mechanism to come into play whereby the catalyst is able to effectuate polymerization upon migration through the now soluble binder material, in consequence of the polyester coating material in which such binder material is soluble. While this expedient is acceptable in the case of coating or laminating fabrics and the like, such as glass fibers and glass fabrics or fleeces, because of the inconsequential effect of the solubility of the binder material in the polyester coating, were such process to be attempted in connection with relatively smooth surfaces, adverse results would occur. Specifically, due to the dissolution of the binder material containing the catalyst, by reason of the solubility of such binder material in the subsequently applied polyester coating material, the original layer of binding material is disturbed and the surface becomes uneven, develops ripples, etc., such that when the polyester coating thereon polymerizes, especially in connection with transparent or translucent coating layers, the ripples and otherwise unevenly developed areas in the binder material layer show through the polyester coating layer, all to the detriment of the attractiveness of the article being treated. In order to achieve the free radical transfer mechanism of this expedient procedure, the binder or lacquer or vehicle used to carry the catalyst and disperse the same onto the surface to be treated prior to the spreading of the polyester coating thereon, must be soluble or at least swellable to a substantial degree in the subsequently applied liquid polyester coating material. The softening of the binder, due to its solubility or swellability in the polyester coating material, causes the production of a poor grade finish on the article, which may be sufficiently acceptable in connection with the impregnation of glass fibers, fleeces, and the like, but which obviously is quite unacceptable where a smooth finish is desired, such as one on a wooden article sought to be coated with a polyester-polymerizable monomer resin mixture.

It is an object of the present invention to overcome the foregoing drawbacks and to provide a process for hardening polyester layers and especially to provide an improved process of coating a surface by the application of a coating material thereto which contains an unsaturated polyester and a polymerizable monomer hardened by a peroxide catalyst, such that the peroxide catalyst and the polyester coating are separately applied, and such that the peroxide catalyst is applied in a hardenable lacquer insoluble in the coating material containing the polyester and monomer.

It is another object of the present invention to provide a process of the foregoing type in which a lacquer, containing the peroxide catalyst and which is capable of hardening to a layer insoluble in the coating material containing the polyester and monomer, is initially applied to the surface in question, allowed to harden to form the insoluble layer, and then the coating material containing the unsaturated polyester and polymerizable monomer is applied to the initially hardened insoluble layer, whereupon the subsequently applied coating sets by the action of the peroxide catalyst.

It is a further object of the present invention to provide a process of the foregoing type in which the peroxide catalyst is applied in a volatile solvent containing the lacquer which is capable of drying and hardening by solvent evaporation to form the hardened layer which is insoluble in the polyester coating next applied, i.e., after the lacquer has in fact hardened.

It is still another object of the present invention to provide a process of the foregoing type in which the hardenable lacquer containing the catalyst and the polyester coating are separately applied in such a manner that the article already containing the hardened lacquer coating thereon may be stored, if desired, and handled without disturbing the desirably smooth finish and so that the polyester coating may be applied at any subsequent time by the workmen in an expedient way without undue attention to the tedious details of forming the finished coating, due to the insolubility of the lacquer in the polyester coating and the ease with which such polyester coating subsequently polymerizes.

It is a still further object of the present invention to provide an improvement in the process of the foregoing type whereby the combined layers of lacquer and catalyst, on the one hand, and polyester and monomer, on the other hand, upon setting of the polyester-monomer containing coating, lead to a smooth and even over-all coating on the surface, such as wood, paper, cardboard, metal, and the like, which is free from the occurrence of ripples, mars, unsightly disturbances, etc. in the surface disposition of the lacquer and which is attractive in appearance and durable in use.

Other and further objects of the present invention will become aparent from a study of the within specification and accompanying drawings, in which FIG. 1 shows a flow sheet consonant with the instant process for hardening polyester layers on an article such as wood, preferably having a smooth and/or even surface, and FIG. 2 is a diagrammatic illustration of a coated wooden article, in accordance with the present invention.

It has now been found in accordance with the present invention that a polymerization of polyester layers can be effected without the necessity of mixing the polyester solutions with the catalyst, and without resorting to the free radical transfer mechanism noted above yet with the finished article being kept free from ripples, mars, etc.

Thus, in accordance with the present invention an improvement in the process of coating a surface by the application of coating material containing an unsaturated polyester and a polymerizable monomer which is hardened by a peroxide catalyst may now be provided, such improvement comprising (a) Initially applying to the surface a lacquer containing such peroxide catalyst which is capable of hardening to a layer which is insoluble with respect to the coating material containing the unsaturated polyester and polymerizable monomer,
(b) Allowing the initially applied lacquer to harden to form such insoluble layer,
(c) Applying the coating material containing the unsaturated polyester and polymerizable monomer to the initially hardened insoluble layer, and
(d) Allowing the subsequently applied coating to set by the action of said peroxide catalyst.

The unsaturated polyester is preferably dissolved in the monomer and such monomer may be, for example, styrene, while the unsaturated polyester may be, for example, one formed from diglycol and maleic anhydride. The lacquer may be nitrocellulose lacquer.

The coating material may contain an accelerator, such as cobalt naphthenate, for the polymerization of the polyester and monomer, and the lacquer or coating material containing the polyester may be provided with a pigment therein and/or any suitable inert filler material, such as talc, etc.

More specifically, the improvement in the coating of a surface by the application thereto of coating material containing the unsaturated polyester and polymerizable monomer hardenable by a peroxide catalyst, contemplates applying to the surface a binder vehicle which contains the peroxide catalyst and which is capable of hardening to a layer which is insoluble with respect to the coating material containing the unsaturated polyester and polymerizable monomer, allowing the applied vehicle to harden to form the insoluble layer, thence applying the coating material containing the unsaturated polyester and polymerizable monomer to the already hardened insoluble layer, and finally allowing the applied coating material to set by the action of the peroxide catalyst.

In accordance with a specific embodiment of the invention, a process for coating surfaces with unsaturated polyesters is provided which comprises coating the surface with a volatile solvent containing lacquer capable of drying and hardening by solvent evaporation to form a layer and containing a peroxide catalyst capable of hardening a solution containing an unsaturated polyester dissolved in a polymerizable monomer, said lacquer when hardened being insoluble in such polyester solution, evaporating the solvent from said layer, thereafter applying a coating of such a solution containing an unsaturated polyester dissolved in polymerizable monomer, and allowing said coating to set by the action of said catalyst without dissolution of said lacquer in contact with said coating. The volatile solvent is generally an inert organic volatile solvent such that the solvent which contains the lacquer may take the form of nitrocellulose while the polyester may be formed from diglycol and maleic anhydride which with the monomer, such as styrene, will harden in the presence of the catalyst, such as cyclohexanone peroxide, to provide the finished durable coating.

It will be realized that the lacquer contemplated by the present invention may comprise any liquid solution or emulsion, or the like, capable of forming a dried coating or hardened coating, such as a coating which hardens by setting, and that such lacquer includes conventional lacquers, enamels, paints, paint vehicles, and the like, with the proviso that the same will be insoluble in the polyester coating. Such lacquer may be used with solvent systems or emulsion systems, optionally with pigments and/or inert fillers being present, for example, nitrocellulose lacquer, which in the commonest form comprises cellulose nitrate in an organic solvent, such as an alcohol, ketone, etc., or more broadly nitrocellulose and/or any natural or synthetic resin, including shellac, which may be carried by a vehicle such as an alcohol (ethanol, and the like); an ether (ethyl ether, and the like); a ketone (acetone, and the like); an ester (ethyl acetate, and the like); an alcohol-ester (ethyl glycollate, and the like); an alcohol-ether (diethyl glycerol, and the like); an alcohol-ketone (diacetone alcohol, and the like); a ketone-ester (ethyl pyruvate, and the like); a ketone-ether (ethoxy acetone, and the like); an ester-ether (ethoxy ethyl lactate, and the like), turpentine, linseed oil, etc., whereupon by evaporation in the case of a volatile inert solvent of the type enumerated and/or setting by hardening, the lacquer resin material, such as nitrocellulose, etc., remaining will be insoluble in the contiguous polyester-monomer containing coating in question. Advantageously, in this connection the lacquer will not be softened by the polyester coating, which may be after-applied, and therefore the lacquer will not be softened or caused to swell to any slight extent which would otherwise prevent the obtaining of a smooth high grade finish on the surface to be coated. A smooth transparent coating of the polyester-monomer containing material may thus exist in relative disposition to the similarly smooth transparent coating of the lacquer containing the catalyst, with no deterioration at the interface therebetween, whereupon such transparent finished over-all coating will possess a degree of attractiveness and a durability in use unobtainable in connection with a similar operation in which the lacquer is soluble in the polyester-monomer coating in question.

In order to accomplish the advantages of the present invention, the articles to be coated or laminated, as the case may be, before being provided with the layer of unsaturated polyester and monomer, such as styrene which is to be ploymerized, are provided with a coating which stimulates the polymerization without resorting to the aforementioned free radical transfer mechanism involving a lacquer which is soluble in the polyester-monomer coating, yet which leads to a smooth, attractive, and durable coating upon the setting thereof by the action of the peroxide catalyst present in the hardened lacquer layer.

In this connection, the salient aspects of the present invention may be achieved in different ways, as may be seen from the following:

(1) The surface coming into contact with the polyester layer to be hardened, e.g. a wood surface to be varnished, or paper, cardboard and the like to be embedded into the polyester, is first treated with the solution of a catalyst containing a binder, e.g. a solution of cyclohexanone peroxide. From this pretreated surface, the polymerization of the polyester applied by brushing, spraying or otherwise, very surprisingly proceeds even through very thick layers when the catalyst solution has dried to form an insoluble layer before applying the layer to be polymerized. Against expectations it was found that too large a quantity of catalyst on the surface effects a retardation of the polymerization so that it is required in this embodiment of the process according to the invention to adapt the concentration of the peroxide in the solvent exactly to the layer thickness of the polyester to be polymerized.

2 to 20 grams of a commercial paste of about 50% of cyclohexanone peroxide (1-hydroxy-1'-hydroperoxide dicyclohexyl peroxide) and a phthalic acid ester type plasticizer are dissolved in 98 to 80 grams of toluene containing a binder, such as a synthetic resin insoluble in the polyester coating, thereby forming an about 1 to 10% peroxide solution containing plasticizer and binder. The surfaces, e.g. wood, etc., to be coated or enwrapped with polyesters are sprayed or brushed with this solution. After evaporation of the solvent, there remains a slightly sticky film, insoluble in the polyester coating, which effects the hardening of the polyester, and the thickness and peroxide content of which must be experimentally adapted to the thickness of the polyester layer to be polymerized.

A suitable polyester is a commercial 70% solution of a condensation product of, for example, 2 mols diglycol, 1 mol maleic anhydride and 1 mol phthalic anhydride in styrene. Before being used, it is advantageous to add to these commercial polyester solutions, for example, 2% of a solution of cobalt naphthenate in styrene which has a cobalt content of 6%.

Wood surfaces are preferably coated directly with this mixture or with a mixture which has been dyed by the addition of pigments, while a dilution with liquid monomers, e.g. styrene, methyl styrene, vinyl toluene, etc., to spray consistency is preferable when using the above-mentioned polyester solutions for varnishing purposes. The preferred spray consistency is 25 seconds as measured in the DIN beaker according to DIN 53211.

(2) According to another embodiment, this difficulty is avoided. The catalyst (or its solution) is mixed with the solution of a usual lacquer binding medium, e.g. of synthetic resin, nitrocellulose, etc., and applied in this form to the surface which is to stimulate the polyester solution to polymerize. For the coating of a wood surface, for example, the peroxide solution mentioned under (1) may be mixed with a nitrocellulose solution in a ratio of 1:1, rather than the binder contemplated under (1), and applied to the wood surface. Then the polyester solution in styrene may be applied to the dried coating by brushing, spraying or by other known techniques whereupon hardening will occur at once.

It is also possible to brush articles of metal with a priming consisting of a suitable adhering binder and one or several peroxides in a common solvent in accordance with the foregoing. To this, superficially dried or thoroughly dried subcoating, which in each case represents a hardened layer insoluble in the polyester coating, the polyester solution in styrene is then applied in the thickness desired and polymerized and hardened by the enclosed peroxide starting from the treated surface. In this working method, the dependence of the rate of polymerization upon the catalyst concentration has been found to be substantially less than in the embodiment first described of the process of the invention.

50 parts of a varniish including 27% of nitro wool, 12% of hard resin (e.g. AW 2 resin, which is insoluble in the polyester coating), 7% of plasticizer (e.g. dibutyl phthalate) and 51% of solvents (e.g. a mixture of butyl acetate, ethyl acetate, butanol and toluene) are ground with 15 parts of talc, 9 parts of calcite and 25 parts of lithopone to prepare a white varnish color. This is mixed with 15% of the peroxide paste mentioned in Example 1 and thereafter adjusted, by means of a mixture of 1 part of butyl acetate and 1 part of ethyl acetate and 2 parts of toluene, to a spray consistency of 25 seconds as determined by DIN 53211. This peroxide priming, in a cloister, is sprayed on a wood surface, allowed to dry for at least 3 hours and not more than 96 hours and oversprayed with a white varnish color consisting of 110 parts of polyester, 30 parts of styrene, 35 parts of titanium dioxide and 25 parts of a 6% cobalt naphthenate solution in styrene. This white varnish color, before being applied, is also adjusted to a spray consistency of 25 seconds by the addition of further amounts of styrene or by the addition of other polymerizable monomers. Other solutions in suitable solvents of synthetic resins, e.g. mixed polymers based on vinyl chloride-vinyl acetate which when hardened are insoluble in the polyester coating, may be used in admixture with the peroxide.

The wood, paper, cardboard, metal, etc. surfaces treated with the peroxide layer and pre-dried in this manner are coated with the commercial polyester solutions and hardened.

(3) A further embodiment in accordance with the invention utilizes the process of what is known as "grafting polymerization" in which a preformed macromolecule, e.g. polystyrene, by the later production of peroxidic groups at several points of the macromolecule, becomes reactive with monomeric polymerizable substances which, by polymerization, are attached as side chains to the main molecule with the mediation of the incorporated peroxide groups. This process of grafting polymerization has hitherto been used only for block polymerization of monomers but not for the preparation of coated wood bodies, etc. If the solution of such a macromolecular material containing firmly incorporated peroxide groups, yet which upon hardening is insoluble in the polyester coating, is used for the treatment of the surfaces to be coated subsequently with polyesters, an absolutely homogeneous film of synthetic resin, the peroxide groups of which are used for stimulating the polymerization of the polyester dissolved in styrene is formed on these surfaces. In this case also, it is possible to treat wood surfaces, paper, cardboard, metals, etc. with this priming solution.

For the production and the chemism of compounds of this kind, the statements by H. Mark, "Darstellung und Eigenschaften einiger Block- und Zweig-Mischpolymerisate," published in "Zeitschrift fuer Angewandte Chemie," vol. 67, pages 53–56 (1955), are considered as directive. For example, it is possible by subsequent oxidation to bring a mixed polymer of styrene and p-isopropyl styrene to a content of hydroperoxidic groups which is sufficient for the further polymerization of the polyester mixture to be hardened.

A solution of the oxidized mixed polymerizate in benzene may directly be used as a reactive priming, but it may also be brought to higher reactivity by the addition of further peroxides, e.g. cyclohexanone peroxide, methyl ethyl ketone peroxide, chlorbenzoyl peroxide, cumene hydroperoxide, etc.

(4) It will be realized in accordance with the foregoing that it is necessary that the surface of the body to be coated with the polyester layer be first treated with the solution of the catalyst, and that understandably the layer of polyester and the catalyst be separately applied and that the binder or dried or hardened lacquer used be insoluble in the polyester coating.

It is only by the application of one of these working methods that it has become possible to coat articles on all sides by dipping them into solutions of polyesters in styrene without disturbing adversely the smooth disposition of the binder or hardened lacquer coating. The solution to be polymerized remains in the liquid state in the dipping bath and on the dipped article since no catalyst is present in the dipping step. An enrichment of peroxides in the dipping bath does not occur even though the priming with catalyst has taken place first, since of course the priming will have been dried prior to the dipping. Specifically, dried subcoatings are not dissolved during the short dipping periods inasmuch as the dried priming is insoluble in the polyester coating and any catalyst contact with the polyester bath would be too short to adversely affect such bath. The process according to the invention may naturally also be used for the preparation of laminates, the laminae of which (wood, paper, cardboard, metal, and the like) are bonded together by polymerized layers such as styrene-polyester layers.

It is true that it is known in glueing wood that condensation products of urea and formaldehyde to brush one wood surface with a hardening solution, and the other surface to be bonded with the first surface with a solution of the condensation product and thereafter to press the two wooden surfaces together for setting. In this case, however, an acid-setting by condensation is involved while the process of the invention involves a polymerization.

Referring to FIG. 1, a flow scheme is shown in which the article to be treated is first coated with the lacquer containing the peroxide catalyst. Such lacquer in this instance comprises a volatile solvent, a binder, such as nitrocellulose, and the peroxide catalyst. The lacquer coating is then dried by evaporation of the solvent contained therein to form a hardened coating which is insoluble in the unsaturated polyester-monomer mixture to be next applied. In the following step a coating of an unsaturated polyester dissolved in a polymerizable monomer is applied, such as, for example, a mixture of a polyester formed from diglycol and maleic anhydride and monomeric styrene. In the last step, the polyester-monomer coating is then set by the action of the catalyst contained in the insoluble layer first applied.

In FIG. 2, the structure of an article treated in accordance with the present invention is shown in detail. Such structure is illustrated as a block of wood A which has been coated in accordance with the scheme of FIG. 1, with a first coating B containing the peroxide catalyst which upon hardening is insoluble in the subsequently applied coating, and onto which there has been applied a second coating composition C containing the polyester. The polymerization of the polyester layer is carried out by the catalyst contained in layer B in the manner of the invention. As a result the coating B, which is insoluble in the coating C, remains smooth and even throughout, and after polymerization of coating C, the entire appearance, as for example where coatings B and C are composed of materials which are transparent and translucent, is free from ripples, mars, unevenness, and the like, especially with regard to the interface between coatings B and C, thus providing an attractively coated wood article with the wood grain showing through coatings B and C with the appearance of a smooth, even, shiny, attractive layer thereon, pleasing in nature and durable in use. Coated articles prepared in the manner of the invention, therefore, may be used to form cabinets for radios, television receivers, and the like, in a simple and efficient manner and without the need for tedious manipulative procedures which would otherwise be necessary to avoid as far as possible the appearance of ripples, mars, unevenness, and the like, in the over-all coating of the finished article. Although the surface to be treated, such as wood, paper, cardboard, metal, and the like, may be perfectly smooth and even, the present invention also contemplates the coating of surfaces which deviate from flat plane surfaces, such as concave and convex, undulating, surfaces and the like, with such surfaces being more or less smooth throughout the contour or contours in question.

Generally, the unsaturated polyesters contemplated herein are liquid polymerizable materials, such as mixtures of unsaturated alkyd resins having a plurality of alpha-beta ethylenically unsaturated groups with an ethylenically unsaturated monomer. These polymerizable polyesters may be formed by reacting together polyhydric alcohols with polycarboxylic acids or acid anhydrides containing alpha-beta ethylenic unsaturation. Ethylenically unsaturated dicarboxylic acids which may be used in accordance with the invention include fumaric acid, maleic acid, glutaconic acid, citraconic acid, itaconic acid, ethidine-malonic acid, mesaconi acid, allyl malonic acid, allyl succinic acid, and the like.

The dihydric alcohols which may be used in connection with the polyester formation include alkylene glycols, such as ethylene glycol, propylene glycols, butylene glycols, hexylene glycols, etc.; condensed glycols, for example diethylene glycol, dipropylene glycol, dibutylene glycol, and the like. Preferred materials are maleic anhydride and diglycol. The preparation of the actual polyester is well known in and of itself.

As to the unsaturated monomers usable in accordance with the invention to form the polymer with the polyester, by the setting action of the peroxide catalyst, these include ethylenically unsaturated monomers, such as styrene, vinyl toluene, dimethyl styrene, and the like, although styrene is preferable.

The peroxide catalysts contemplated herein are the usual catalyst for achieving the setting of polyester-monomer resins of the foregoing type, and these include the usual peroxides such as those specifically mentioned hereinabove, especially under Example 3.

It will be appreciated that the instant specification, drawings and examples are set forth by way of illustration and not limitation, and that various modifications and changes may be made without departing from the spirit and scope of the present invention which is to be limited only by the scope of the appended claims.

What is claimed is:

1. In the process of coating a smooth surface by the application of coating material containing an unsaturated polyester and a polymerizable monomer which is hardened by a peroxide catalyst, the improvement which comprises (a) initially applying to the surface a nitrocellulose lacquer containing such peroxide catalyst which is capable of hardening to a layer correspondingly containing substantially completely said catalyst therein and which is insoluble with respect to the coating material containing the unsaturated polyester and polymerizable monomer, (b) allowing the initially applied lacquer to harden to form such insoluble layer correspondingly containing substantially completely said catalyst therein, (c) applying the coating material containing the unsaturated polyester and polymerizable monomer to the initially hardened insoluble layer, and (d) allowing the subsequently applied coating to set by the action of said peroxide catalyst without dissolution of said layer in contact with said coating material.

2. Improvement according to claim 1 wherein said unsaturated polyester is dissolved in said monomer.

3. Improvement according to claim 2 wherein said monomer is styrene.

4. Improvement according to claim 3 wherein said unsaturated polyester is formed from diglycol and maleic anhydride.

5. Improvement according to claim 4 wherein said coating material contains an accelerator.

6. Improvement according to claim 5 wherein said accelerator is cobalt naphthenate.

7. Improvement according to claim 4 wherein said lacquer contains a pigment therein.

8. Improvement according to claim 7 wherein said coating material contains a pigment therein.

9. In the process of coating a smooth surface by the application thereto of coating material containing an unsaturated polyester and a polymerizable monomer which is hardened by a peroxide catalyst, the improvement which comprises applying to the surface an organic binder vehicle which contains nitrocellulose and such peroxide catalyst and which is capable of hardening to a layer correspondingly containing substantially completely said catalyst therein and which is insoluble with respect to such coating material containing the unsaturated polyester and polymerizable monomer, allowing the applied vehicle to harden to form such insoluble layer correspondingly containing substantially completely said catalyst therein, applying such coating material the unsaturated polyester and polymerizable monomer to the hardened insoluble layer, and allowing the applied coating material to set by the action of said peroxide catalyst without dissolution of said layer in contact with said coating material.

10. Process for coating smooth surfaces with unsaturated polyesters which comprises coating the surface with a volatile solvent containing nitrocellulose lacquer capable of drying and hardening by solvent evaporation to form a layer and containing a peroxide catalyst capable of hardening a solution containing an unsaturated polyester dissolved in a polymerizable monomer, said lacquer when hardened being insoluble in such polyester solution and correspondingly containing substantially completely said catalyst therein, evaporating the solvent from said layer, thereafter applying a coating of such a solution containing an unsaturated polyester dissolved in a polymerizable monomer, and allowing said coating to set by the action of said catalyst without dissolution of said lacquer in contact with said coating.

11. Process according to claim 10 wherein the volatile solvent is an inert organic volatile solvent.

12. Process for coating smooth surfaces with unsaturated polyesters which comprises coating the surface with a solution of nitrocellulose in acetone capable of drying and hardening by acetone evaporation to form a nitrocellulose layer and containing cyclohexanone peroxide as a catalyst capable of hardening a solution containing an unsaturated polyester formed from diglycol and maleic anhydride dissolved in styrene as polymerizable monomer, said nitrocellulose when hardened being insoluble in such polyester solution, evaporating the acetone from the resultant coating solution layer, thereafter applying a coating of such a solution containing said unsaturated polyester dissolved in said polymerizable monomer, and allowing said coating to set by the action of said catalyst without dissolution of said nitrocellulose in contact with said coating.

References Cited

UNITED STATES PATENTS 2,978,354  4/1961  Lesser _____ 171—161 X
3,218,190  11/1965  Patterson et al. _____ 117—75 X

FOREIGN PATENTS 1,025,302  2/1958  Germany.

ALFRED L. LEAVITT, *Primary Examiner.*

RALPH S. KENDALL, *Examiner.*